US005705958A

United States Patent [19]

Janer

[11] Patent Number: 5,705,958

[45] Date of Patent: Jan. 6, 1998

[54] APPARATUS FOR CORRECTING QUADRATURE ERROR IN A MODULATOR AND/OR IN A DEMODULATOR FOR A SIGNAL HAVING A PLURALITY OF PHASE STATES, A CORRESPONDING TRANSMITTER, AND A CORRESPONDING RECEIVER

[75] Inventor: Patrick Janer, Levallois Perret, France

[73] Assignee: Alcatel Telspace, Nanterre Cedex, France

[21] Appl. No.: 721,207

[22] Filed: Sep. 26, 1996

[30] Foreign Application Priority Data

Sep. 27, 1995 [FR] France ..................................... 95 11315

[51] Int. Cl.$^6$ .............................. H03C 3/00; H03D 3/00; H04L 27/18

[52] U.S. Cl. .......................... 332/103; 329/304; 375/308; 375/329

[58] Field of Search ..................................... 332/103–105; 329/304–310; 375/296, 298, 308, 324–325, 329–333, 345–346, 348–349

[56] References Cited

U.S. PATENT DOCUMENTS 5,077,757 12/1991 Cahill ........................................ 375/298
5,105,445 4/1992 Karem et al. ........................ 375/298 X
5,111,155 5/1992 Keate et al. ............................ 330/149
5,371,481 12/1994 Tiittanen et al. ...................... 332/103

FOREIGN PATENT DOCUMENTS

0503588A2 9/1992 European Pat. Off. .
0570979A1 11/1993 European Pat. Off. .
0647031A1 4/1995 European Pat. Off. .

OTHER PUBLICATIONS

H. Suzuki et al, "Affine transformations for compensating linear distortion: an application to linear signaling in mobile radio", *Electronics and Communications* vol. 75, No. 11, Nov. 1992, pp. 47–58.

Faulkner et al, "Automatic adjustment of quadrature modulators", *Electronics Letters*, vol. 27, No. 3, Jan. 31, 1991, Stevenage GB, pp. 214–216.

*Primary Examiner*—David Mis
*Attorney, Agent, or Firm*—Sughrue, Mion, Zinn, Macpeak & Seas, PLLC

[57] ABSTRACT

Apparatus for correcting quadrature error in a quadrature modulator and/or in a demodulator for a signal having a plurality of phase states, or of amplitude and phase states. The correction apparatus comprises a processor (51) which, when the apparatus is used to correct quadrature error in a demodulator, transforms the levels P and Q of the digital signals output by the demodulation stage into corrected levels P' and Q' that satisfy any one of the following eight relationships:

| | | | | | | | | |
|---|---|---|---|---|---|---|---|---|
| P' | P + Q | P + Q | −P − Q | −P − Q | Q − P | P − Q | Q − P | P − Q |
| Q' | Q − P | P − Q | Q − P | P − Q | P + Q | P + Q | −P − Q | −P − Q |

These corrected levels are then applied to decision element (72), optionally after their maximum levels have equalized. The apparatus combines correction accuracy with cheapness, and it enables any quadrature error to be corrected.

7 Claims, 7 Drawing Sheets

APPARATUS FOR CORRECTING QUADRATURE ERROR IN A MODULATOR AND/OR IN A DEMODULATOR FOR A SIGNAL HAVING A PLURALITY OF PHASE STATES, A CORRESPONDING TRANSMITTER, AND A CORRESPONDING RECEIVER

BACKGROUND OF THE INVENTION

The invention relates to transmitters or receivers for signals having a plurality of phase states, and obtained by M-state phase-shift keying (M-PSK) or more generally by M-state amplitude and phase shift keying (M-APSK).

The invention relates more precisely to apparatus for correcting the constellation of a signal of the M-APSK type, in which constellation each symbol is determined by two amplitude levels P and Q carried by two axes X and Y that are ideally in phase quadrature. The invention is applicable to correcting a phase quadrature error in a modulator or in a demodulator, that operates ideally in quadrature.

For modulation (i.e. keying) having a plurality of phase states, e.g. $2^n$ phase states, if a diagram of the type using Cartesian coordinates in a signal space is desired, the phase states can be placed at equal distances from the axes corresponding to the orthogonal carrier signals X and Y. A constellation is thus obtained that corresponds to the vector diagram of the states of the carrier signals whose projections on the axes X and Y give the coordinates of the vector ends shown.

Figure 3:
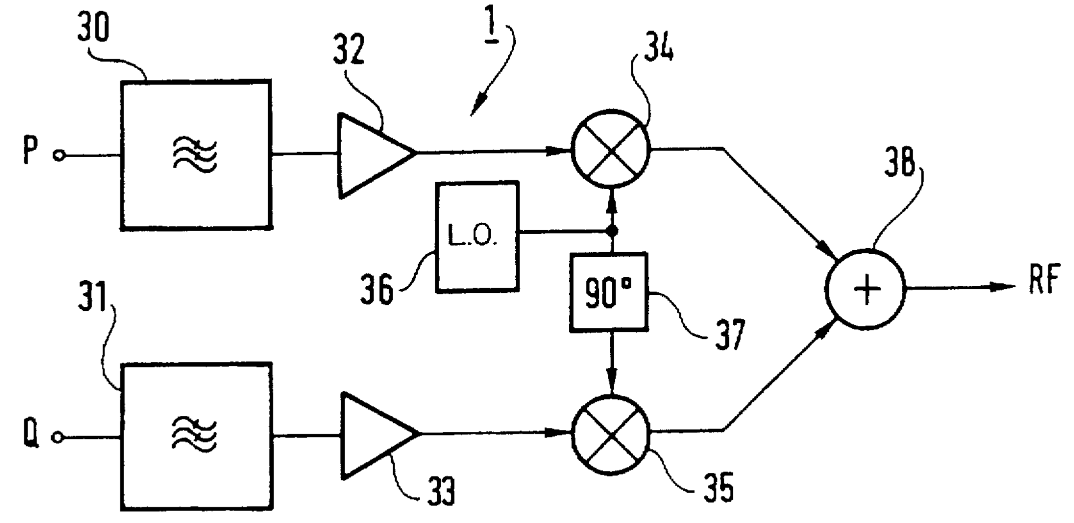

FIG. 3 is a diagram summarizing a known modulation stage 1 of a transmitter for a signal of the M-APSK type. Two streams of baseband analog signals P and Q are applied to two respective low-pass filters 30 and 31, each of which is followed by a respective amplifier 32, 33. The amplified signals are applied to a quadrature signal modulator including two mixers 34 and 35 receiving signals in phase quadrature from a local oscillator 36 and from a 90° phase-shifter referenced 37. The output signals from the mixers 34 and 35 are applied to a summing circuit 38 supplying an RF signal of the M-APSK type that is applied, for example, to a transmission antenna (direct modulation).

Figure 4:
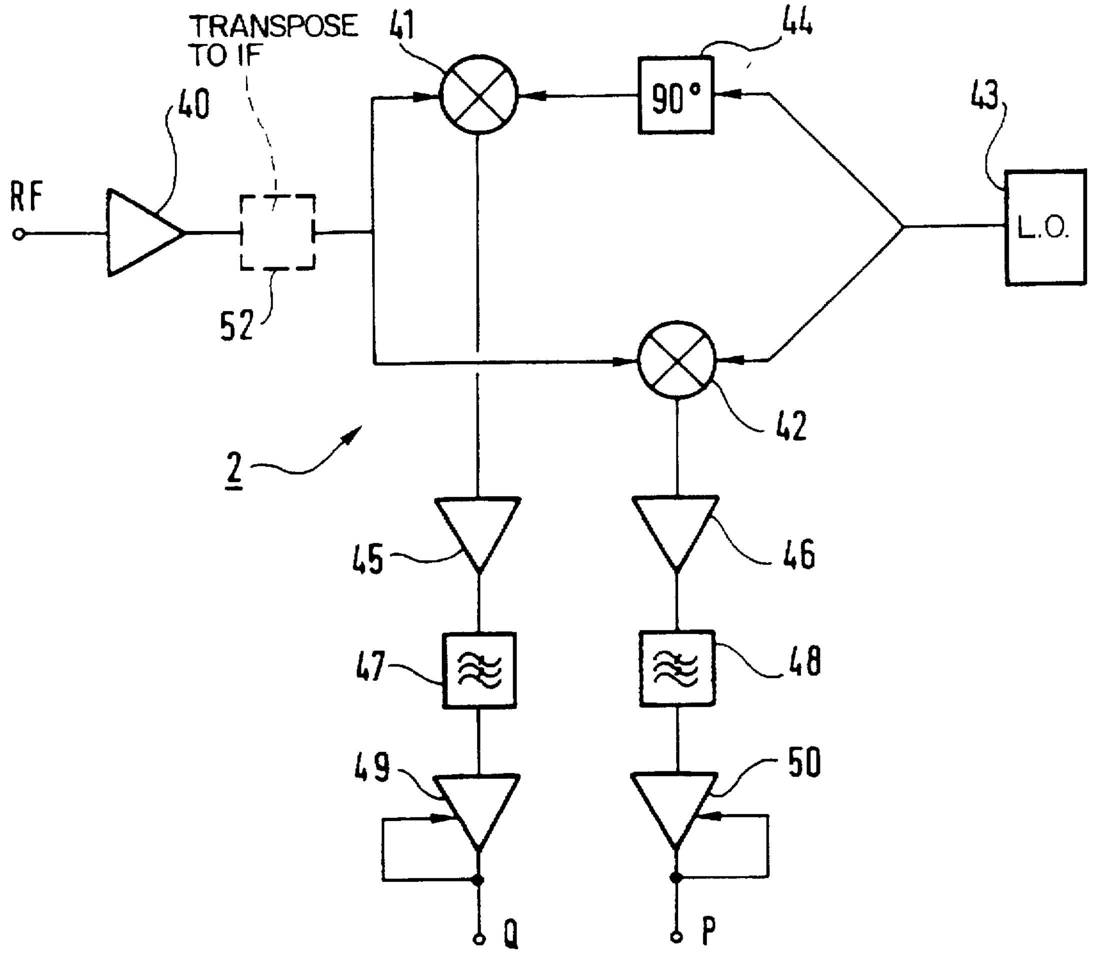

FIG. 4 is a diagram summarizing a known demodulation stage 2 of a receiver for such an RF signal. The received RF signal is applied to a low-noise amplifier 40 followed by two mixers 41 and 42 receiving demodulation signals from a local oscillator 43 and from a 90° phase-shifter referenced 44. In IF demodulation, the input amplifier 40 (which is then not a low-noise amplifier) is followed by an intermediate-frequency transposer referenced 52 and shown in dashed lines. The signals output from the mixers 44 and 42 are baseband signals. These signals are applied to respective amplifiers 45 and 46 followed by respective low-pass filters 47 and 48, themselves followed by respective automatic gain control (AGC) amplifiers 49 and 50. In the absence of interference, the output signals from the amplifiers 49 and 50 correspond to the baseband signals P and Q in FIG. 3. After being digitized, the signals P and Q constitute samples that make it possible to reconstitute the transmitted symbols.

Figure 2:
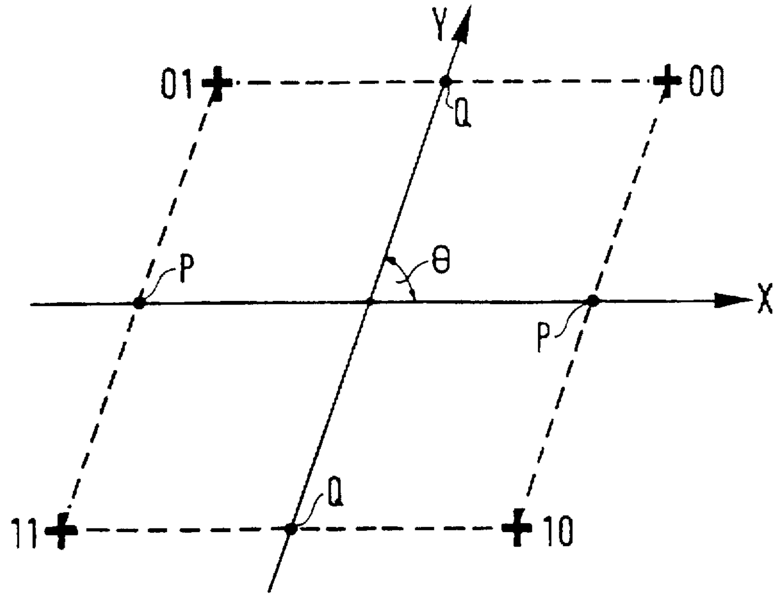
FIG. 2 shows a constellation of a signal of the 4-PSK type obtained using two axes X and Y which are not in phase quadrature ($\theta \neq 90°$). The constellation is distorted and is diamond-shaped in appearance.

At a transmitter transmitting a signal whose constellation is distorted as shown in FIG. 2 (quadrature error), quadrature phase error can be likened to crosstalk between the P and Q channels, which reduces the performance of the transmitter.

At a receiver receiving a signal having a plurality of phase states or having a plurality of amplitude and phase states, quadrature phase error can also be likened to crosstalk between the P and Q channels and it thus reduces the performance of the receiver likewise.

For any given quadrature error, the higher the number of states of the signal having a plurality of phase states or having a plurality of amplitude and phase states, the greater such reduction in performance, both at a transmitter and at a receiver, since the crosstalk due to the quadrature error moves the demodulated signal closer to the boundary of the decision zone specific to each state.

It is known that quadrature error can be corrected by acting on the polarizations of the mixers, at the transmitter or at the receiver. Such correction apparatus is described, for example, in the following patent applications: FR-A-2 711 027, FR-A-2 641 923, and EP-A-0 614 300.

Known apparatus suffers from the drawbacks of being complex to implement and of using a regulating loop that includes a quadrature estimator. The presence of a regulating loop gives rise to multiple drawbacks: its parameters must be set as a function of the mixers used (which limits their interchangeability), it can be a source of unwanted oscillations because of instability problems, and it can be sensitive to temperature variations.

Furthermore, quadrature errors can be corrected over a narrow range only, generally up to a phase difference $\theta$ between the axes X and Y of about 70° (i.e. for a quadrature error $\phi$ of about 20°). This requires mixers to be used that are of good quality and therefore costly.

SUMMARY OF THE INVENTION

An object of the present invention is to mitigate these drawbacks.

More precisely, an object of the invention is to provide apparatus that removes quadrature error in a modulation stage or in a demodulation stage for signals having a plurality of phase states or of amplitude and phase states, which apparatus does not use a regulating loop and does not act on the mixers.

Another object of the invention is to provide such apparatus suitable for correcting a large quadrature error, thereby enabling cheap mixers to be used that can be made fully interchangeable.

An additional object of the invention is to provide such apparatus that is simple in structure and that uses very few components, and is therefore cheap.

These objects and others that appear below are achieved, in a demodulation stage, by means of apparatus for correcting quadrature error in the demodulation stage. The demodulation stage supplies a digital signal constituted, at each symbol time, by a symbol of a constellation having a plurality of phase states or of amplitude and phase states, each symbol of the constellation being determined by two amplitude levels P and Q output by the demodulation stage. The apparatus comprises processing means supplying two corrected amplitude levels P' and Q' on the basis of the amplitude levels P and Q, said corrected amplitude levels P' and Q' being respectively equal to the values in any one of the following pairs of values:

P+Q and Q–P
P+Q and P–Q
–P–Q and Q–P
–P–Q and P–Q
Q–P and P+Q
P–Q and P+Q
Q–P and –P–Q
P–Q and –P–Q These corrected amplitude levels may then be applied to decision means.

In a modulation stage in which quadrature error is to be corrected, apparatus is used for correcting quadrature error in the modulation stage. A digital-type modulating signal is applied to the modulation stage, the signal being constituted, at each symbol time, by a symbol of a constellation having a plurality of phase states or of amplitude and phase states. Each symbol of the constellation is determined by two amplitude levels P and Q. The correction apparatus of the invention comprises processing means supplying two corrected amplitude levels P' and Q' on the basis of the amplitude levels P and Q, said corrected amplitude levels P' and Q' being applied to the modulation stage and being respectively equal to the values in any one of the above-mentioned pairs of values.

The invention thus proposes to act directly on the base-band streams by modifying the values of the amplitudes of the samples, determined at each symbol time.

When correcting quadrature error in a modulator, the baseband signals constituting signals modulating two carrier signals ideally in phase quadrature are combined by linear operations to supply corrected signals whose amplitudes are in fact carried by fictitious axes that are in perfect phase quadrature. When correcting quadrature error in a demodulator, the baseband signals are those output by the demodulation stage, and they are combined in any of the above-mentioned manners to supply corrected signals whose amplitudes are also carried by fictitious axes that are in perfect phase quadrature. When correcting quadrature in a demodulation stage, the processing means are advantageously preceded by automatic gain control amplification means ensuring that the maximum levels of the amplitude levels P and Q are equal.

Advantageously, the processing means are also followed by automatic gain control amplification means ensuring that the maximum levels of the corrected amplitude levels are equal.

The invention also provides a transmitter and a receiver for signals having a plurality of phase states or of amplitude and phase states, the transmitter and the receiver including such processing means.

BRIEF DESCRIPTION OF THE INVENTION

Figure 1:
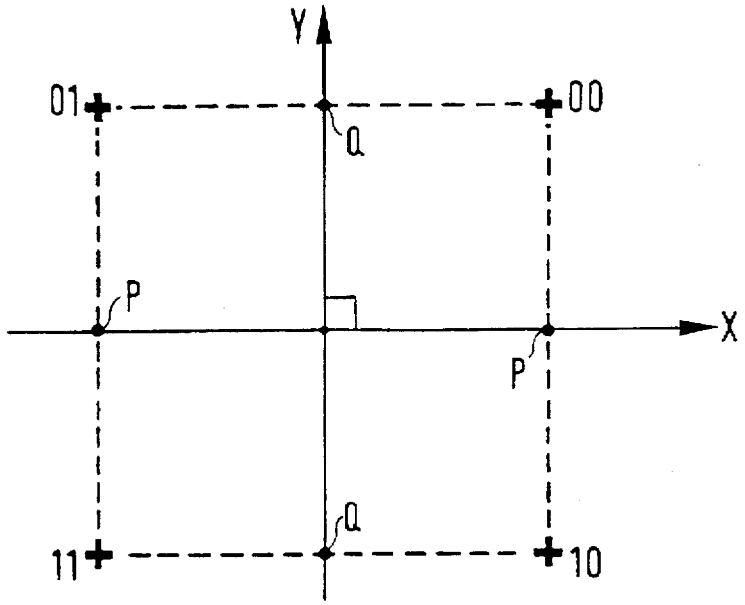
FIG. 1 shows a constellation of a signal of the four-state (quaternary) phase-shift keying (4-PSK or QPSK) type, this constellation being obtained using two axes X and Y in phase quadrature. The amplitudes of the samples are referenced P and Q, and the corresponding symbols are referenced 00, 01, 10, and 11.
Figure 5:
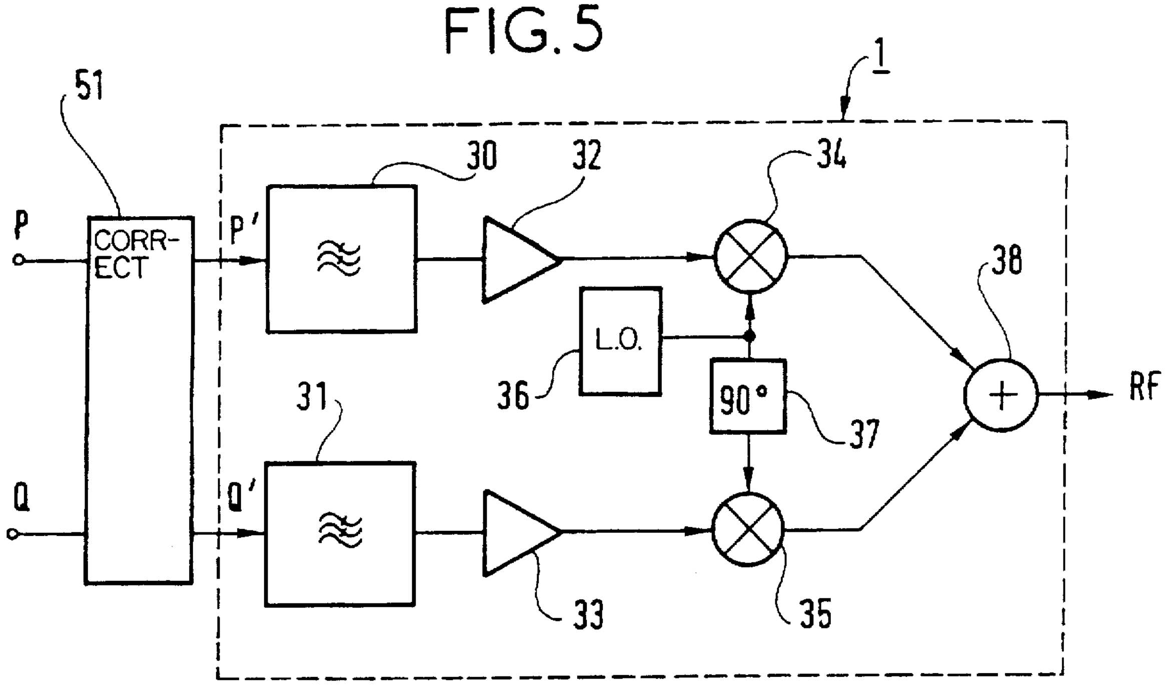
Figure 6:
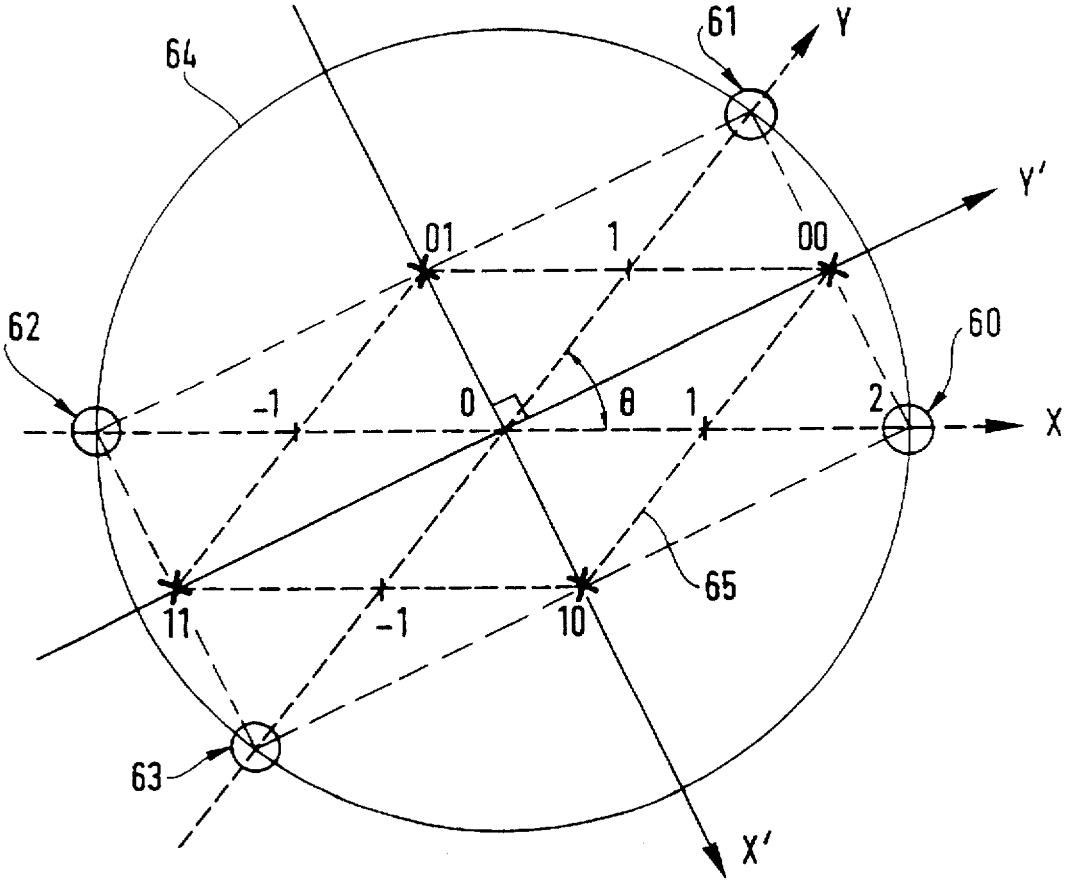
Figure 7:
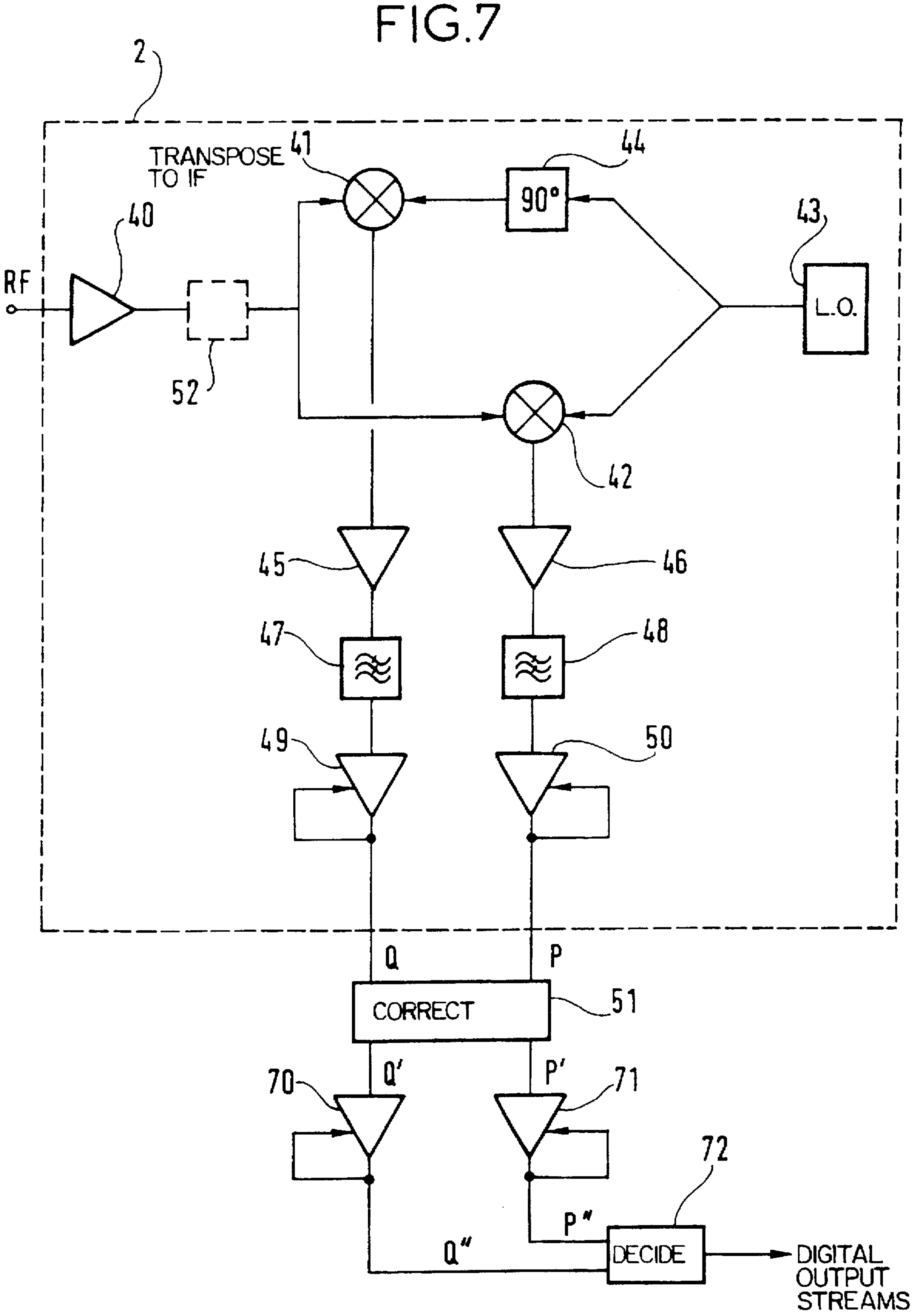
Figure 8:
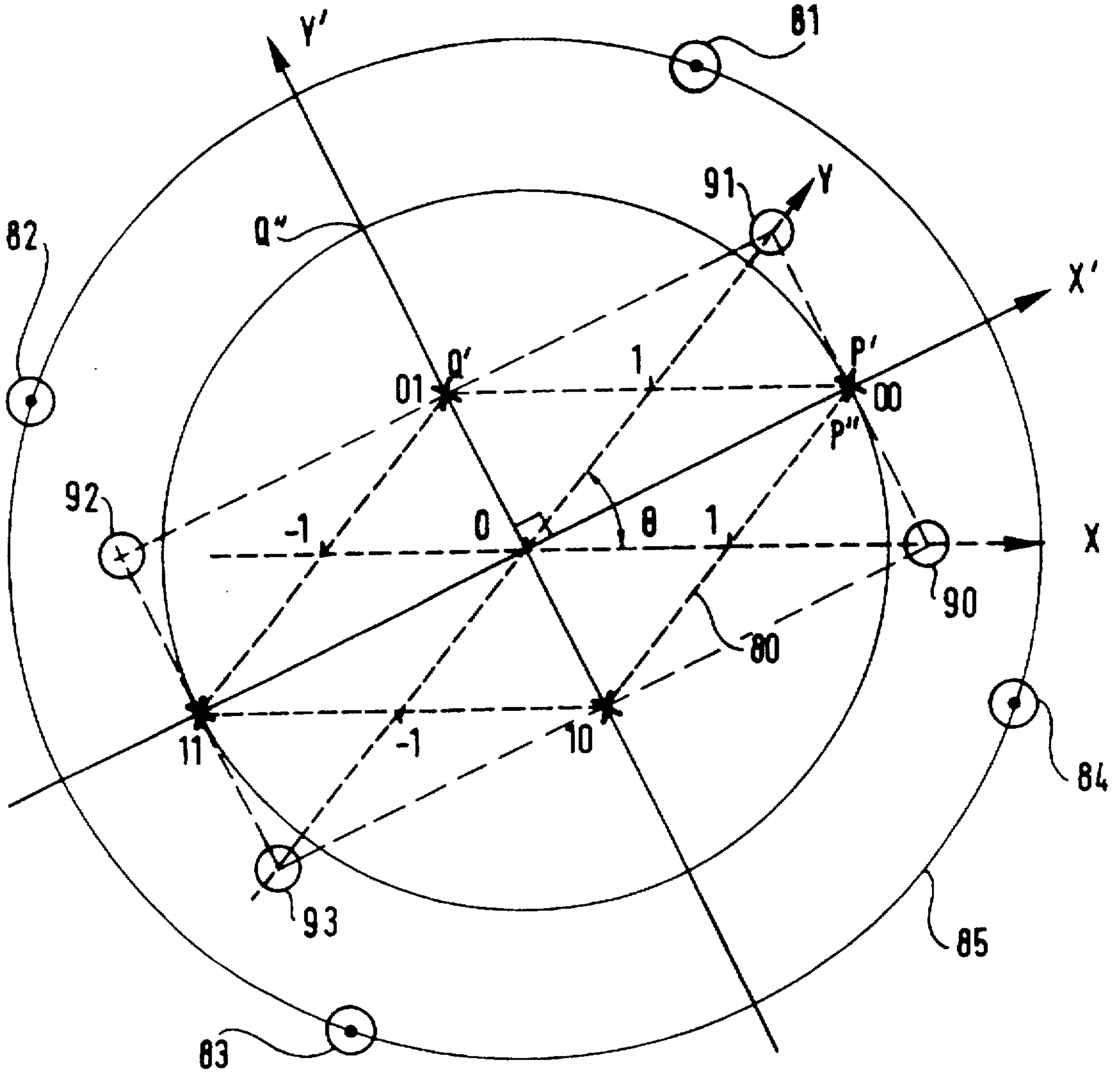
Figure 9:
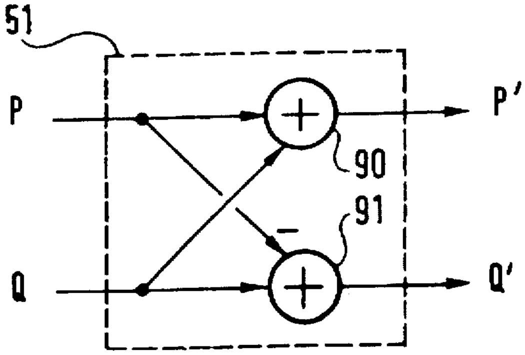
Figure 10:
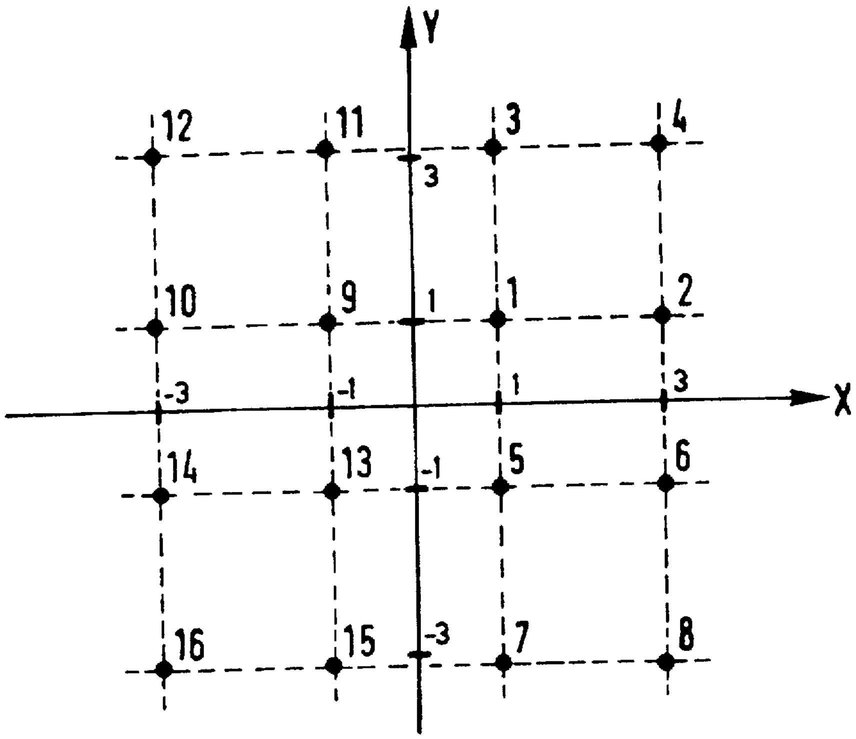
Figure 11:
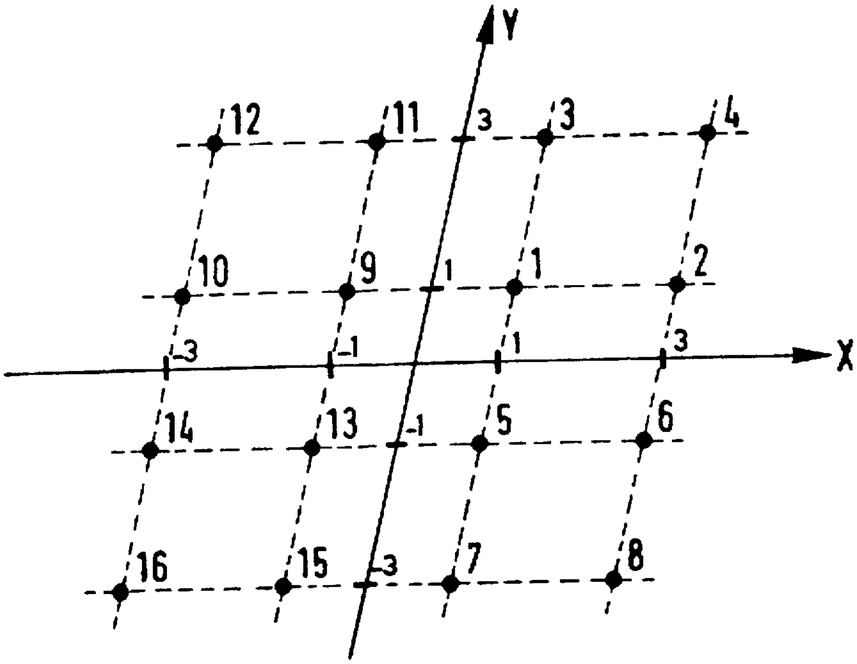
Figure 12:
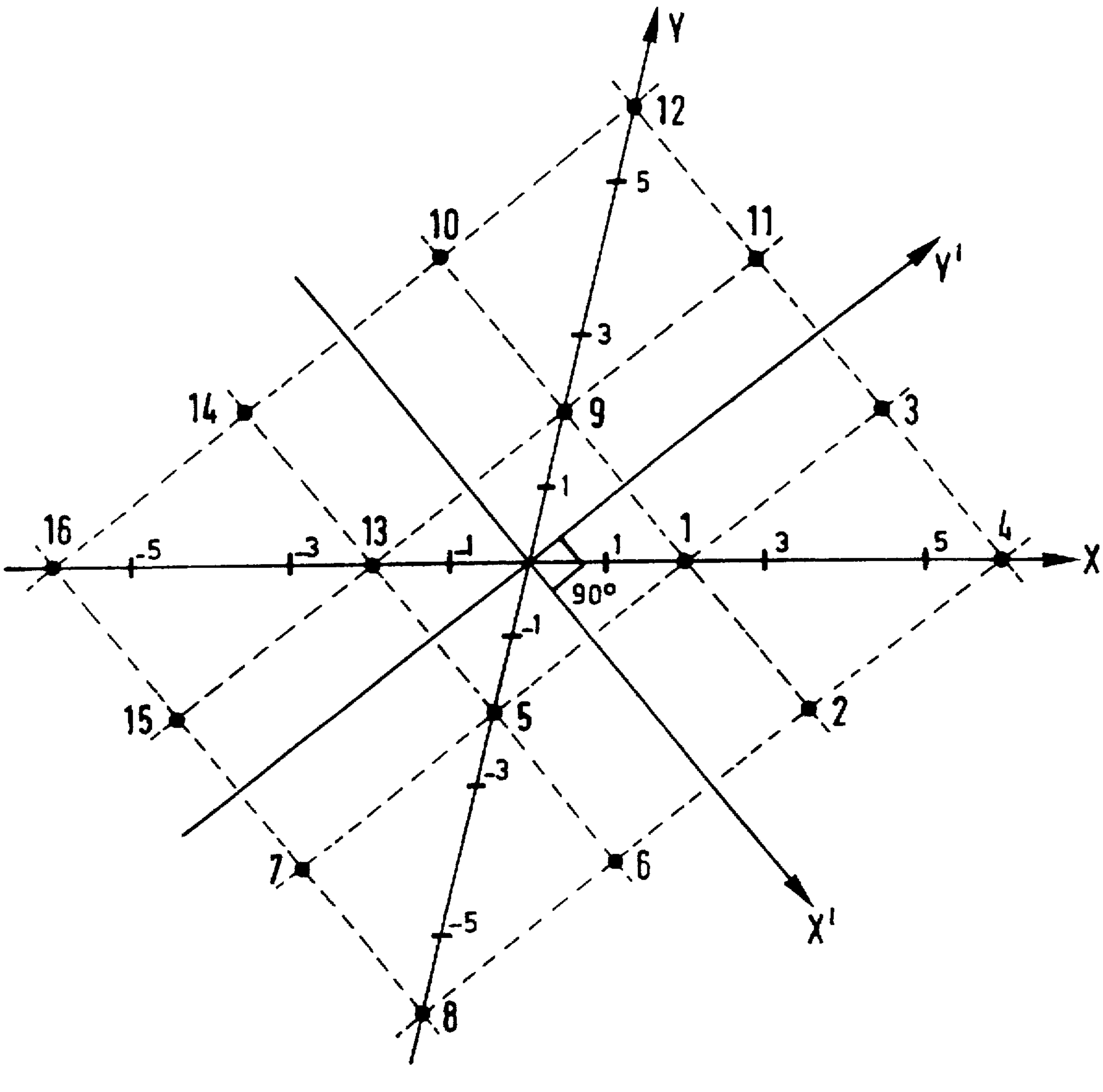

Other characteristics and advantages of the invention appear on reading the following description of two preferred embodiments given by way of non-limiting example and with reference to the accompanying drawings, in which:

FIG. 1 is a constellation of a 4-PSK type signal obtained using two axes X and Y in phase quadrature;

FIG. 2 shows a constellation of a 4-PSK type signal obtained using two axes X and Y which are not in phase quadrature;

FIG. 3 is a diagram summarizing a modulation stage of a transmitter for transmitting an RF signal of the M-APSK type;

FIG. 4 is a diagram summarizing a demodulation stage of a receiver for receiving an RF signal transmitted by a transmitter as shown in FIG. 3;

FIG. 5 is a diagram summarizing a preferred embodiment of a transmitter including correction apparatus of the invention;

FIG. 6 shows firstly a constellation of a 4-PSK signal as obtained using a modulator having quadrature error, and secondly the constellation of this signal as obtained by associating the modulator with the correction apparatus of the invention;

FIG. 7 is a diagram summarizing a preferred embodiment of a receiver including correction apparatus of the invention;

FIG. 8 shows firstly a constellation of a signal having four phase states as obtained using a demodulator having quadrature error, and secondly the constellation of this signal as obtained by associating the demodulator with the correction apparatus of the invention;

FIG. 9 is a diagram summarizing an embodiment of the processing means of the invention;

FIG. 10 shows an ideal constellation for a 16-APSK signal;

FIG. 11 shows a constellation of a 16-APSK signal affected by quadrature error; and FIG. 12 shows the constellation of the FIG. 11 signal after the quadrature error has been corrected.

DETAILED DESCRIPTION OF THE INVENTION

FIGS. 1 to 4 are described above with reference to the state of the art.

FIG. 5 is a diagram summarizing a preferred embodiment of a transmitter including correction apparatus of the invention. The correction apparatus is referenced 51 and is placed upstream from the modulation stage 1 which is identical to the stage shown in FIG. 3. The correction apparatus 51 receives at its inputs the amplitude levels P and Q corresponding to the signals to be transmitted, and it supplies corrected amplitude levels P' and Q' on the basis of the levels P and Q, which corrected amplitude levels are applied to the modulation stage 1.

According to the invention, the amplitude levels P' and Q' are equal to the amplitude levels in any one of the eight columns in Table 1.

TABLE 1

| | 1 | 2 | 3 | 4 | 5 | 6 | 7 | 8 |
|---|---|---|---|---|---|---|---|---|
| P' | P + Q | P + Q | –P – Q | –P – Q | Q – P | P – Q | Q – P | P – Q |
| Q' | Q – P | P – Q | Q – P | P – Q | P + Q | P + Q | –P – Q | –P – Q |

By way of example, if column 1 is chosen, then P' is equal to P+Q and Q' is equal to Q–P.

It can be observed that the corrected amplitude levels P' and Q' result from linear combinations of the amplitude levels P and Q. The level transformation function performed is explained with reference to FIG. 6 which shows firstly a signal having four phase states (4-PSK) as obtained by means of a modulator having quadrature error, and secondly the corrected constellation of this signal as obtained by associating the modulator with the correction apparatus of the invention.

The center of both constellations is referenced O, and the axes X and Y (in dashed lines) are the axes carrying the amplitude levels of the signals P and Q. The phase difference θ between the axes X and Y is about 50° in this example, i.e. the quadrature error ϕ is about 40°. The symbols of the constellation as obtained in the absence of correction are shown by crosses. This constellation is similar to the constellation shown in FIG. 2, and it is diamond-shaped 65. Symbol 00 corresponds to amplitude levels (P,Q) equal to (1,1), at symbol 01 the amplitude levels correspond to (−1,1), at symbol 11 the amplitude levels correspond to (−1,−1), and at symbol 10 the amplitude levels correspond to (1,−1).

By way of example, it is considered that the apparatus 51 shown in FIG. 5 supplies P'=P+Q and Q'=Q−P respectively. Considering the first quadrant, P' is equal to 1+1=2 (plotted on the axis X) and Q' is equal to 1−1=0. The corresponding corrected symbol is therefore situated on the axis X with an amplitude value of 2. It is referenced 60 and is represented by a circle. Considering the second quadrant, P and Q are respectively equal to −1 and 1, i.e. P' and Q' are respectively equal to 0 and 2. The corrected symbol 61 carried by the axis Y is thus obtained. By repeating this operation for the other two quadrants, the corrected symbols 62 and 63 are generated.

The full originality of the invention is to be found in this processing which makes it possible to obtain symbols in a new constellation 64 (shown in solid lines) referenced relative to two new fictitious axes X' and Y' which are in phase quadrature. All of the corrected symbols 60 to 63 are at the same distance from the center O of the constellation, and the quadrature error has been compensated merely by replacing P and Q by P'=P+Q and by Q'=Q−P.

The preceding example is given for a signal of the 4-PSK type, but the invention is equally applicable to phase modulation having higher numbers of states, and to QAM-type modulation, regardless of the number of states, as described below.

Two consequences of this correction can be noted:

The correction imparts amplitude modulation on transmission (the symbols are closer to the axis Y' than to the axis X' in this example). Whenever quadrature error exists, the correction made by the apparatus of the invention inevitably imparts amplitude modulation, and the larger the quadrature error ϕ to be corrected, the larger the amplitude modulation imparted. However, this is not critical insofar as when the quadrature error is small (in particular less than 5°), the energy loss on one of the modulated signals (carrier signal or IF signal), which loss is constant, is less than 0.8 dB relative to the modulated signal on the quadrature axis. The resulting deterioration in the bit error rate for the same mean signal level relative to a conventional constellation is then limited to a factor of about 1.5.

The correction rotates the constellation (negatively in this case because θ is less than 90°). This rotation is not problematic because, on reception, the carrier recovery apparatus performs the necessary synchronization.

FIG. 7 is a diagram summarizing a preferred embodiment of a receiver including correction apparatus of the invention.

The receiver shown includes the demodulation stage 2 shown in FIG. 4, and it supplies the amplitude levels P and Q in baseband to the correction apparatus 51 of the invention. For example, this apparatus is identical to the apparatus used in the corresponding transmitter transmitting the RF signal, and it supplies corrected levels P'=P+Q and Q'=Q−P. Any other combination of P and Q in any one of the columns in Table 1 is possible. The corrected amplitude levels P' and Q' supplied by the correction apparatus make it possible to obtain a constellation defined using two fictitious axes X' and Y' in phase quadrature, as shown in FIG. 8.

FIG. 8 shows firstly a constellation of a 4-PSK signal as obtained by means of a demodulator having quadrature error, and secondly the constellation of the signal as obtained by associating the correction apparatus of the invention with the demodulator.

As in FIG. 6 described above, the symbols constituting the constellation output by the demodulator 2 having quadrature error are represented by crosses. The constellation is referenced 80 and is diamond-shaped. In this example, the amplitude levels P and Q are equal and the axes X and Y intersect each other at an angle θ close to 50° (ϕ≈40°).

Thus, by considering firstly the symbol 00 in the non-corrected constellation, its coordinates are (1,1). The values of its coordinates after correction are thus as follows: on the axis X, P'=P+Q=2, and on the axis Y, Q'=Q−P=0. The symbol 00 of the corrected constellation is referenced 90. The same reasoning may be applied to the other three symbols to obtain the corrected symbols 91 to 93. Two new fictitious axes X' and Y' are thus defined in phase quadrature and carrying samples having the corrected values P' and Q'. The quadrature error imparted by the demodulator is thus properly corrected.

However, it can be observed that the constellation is also compressed in this example, due to an amplitude difference between the levels P' and Q'. In order to recover a constellation of symbols that are at equal distances from the origin O, the invention then proposes to apply the corrected amplitude levels P' and Q' to automatic gain control (AGC) amplification means 70, 71 (FIG. 7) ensuring that the maximum levels of the corrected amplitude levels P' and Q' are equal.

The dynamic range of the amplification means 70, 71 is not less than the expected amplitude difference between the corrected amplitude levels P' and Q', and it therefore depends on the maximum quadrature error to be corrected.

The dynamic range of the AGC amplifiers 70 and 71 depends on the maximum correction to be made, as a function of the following table which expresses the amplitude difference in dB as a function of the quadrature error ϕ expressed in degrees.

| ϕ (°) | 0 | 1 | 2 | 5 | 10 | 20 | 30 | 45 | 60 | 80 | 90 |
|---|---|---|---|---|---|---|---|---|---|---|---|
| −20log (X'/Y') | 0 | 0.15 | 0.30 | 0.76 | 1.52 | 3.10 | 4.77 | 7.66 | 11.44 | 21.16 | ∞ |

The AGC amplifiers 70 and 71 must act slowly compared with the transmitted symbol rate so that they do not react to the amplitude variations associated with the M-APSK type modulation, or more generally to the low-pass filtering 47, 48 performed upstream (with M-PSK and M-APSK).

Thus, as shown in FIG. 8, level P' is, for example, maintained constant (P' is equal to P" in this example), whereas level Q' is brought to a level Q" that is the same level as level P'. After sampling, the amplitude levels P" and Q" constitute samples making it possible to define a new corrected symbol 81 corresponding to the symbol 91. The other symbols are referenced 82 to 84 (respectively corresponding to the symbols 92, 93, and 90) and the constellation is placed on a circle 85.

The preceding description concerns analog-type processing of levels P and Q. In this case, the corrected levels P' and Q' may, for example, be obtained by means of apparatus as shown in FIG. 9 which is a diagram summarizing an embodiment of the processing means 51 according to the invention.

The processing means shown supply P'=P+Q and Q'=Q−P. They use an adder 90 and a subtractor 91 that are, for example, implemented based on operational amplifiers. An elegant manner of performing the processing consists in using the operational amplifiers 70 and 71 constituting automatic gain control amplifiers and supplying the levels P" and Q" directly.

Digital processing of the levels P and Q is however preferred so as, in particular, to enable a fully digital modem to be implemented. In which case, digital-to-analog conversion is provided at the transmitter prior to frequency transposition, and, at the receiver, analog-to-digital conversion is provided downstream from the frequency transposition. In this case, calculation of P' and Q' on the basis of P and Q is performed by digital means.

The levels P' and Q' may be applied to decision means for deciding the values of the received symbols. The decision may be a direct decision. In the case of digital processing, the amplification means 70 and 71 downstream form the processing means 51 are implemented in digital form, and the levels P" and Q" are applied to the decision means (referenced 72 in FIG. 7 and supplying digital output streams).

The processing means 51 are advantageously preceded by automatic gain control amplification means 49, 50 ensuring that the maximum levels of the amplitude levels P and Q are equal. For example, these amplification means may be constituted by the AGC amplifiers mentioned above with reference to FIG. 4. The errors of the demodulator are thus compensated, especially in the case of direct demodulation, i.e. demodulation without using intermediate frequency.

By way of indication, whether for direct demodulation or for IF demodulation, the dynamic range of the AGC amplifiers 49 and 50 may be a few dB, e.g. 10 dB.

Naturally, all of the values for P' and Q' given in Table 1 are suitable for correcting the quadrature error, on transmission and/or on reception. It can be noted that columns 5 to 8 are complementary to columns 1 to 4, the resulting constellations being complementary in this case to those obtained for columns 1 to 4 (permutation of the axes X and Y). In general, as a function of the chosen processing, it suffices to compensate the values decided during the decision operation (i.e. when a symbol is associated with a binary value) performed in the decision means 72.

The signal processing performed in the present invention may be mathematically expressed by the following operations, assuming that P'=P+Q and Q'=Q−P.

The equivalent in baseband of the signal transmitted in the ideal case (perfect quadrature) and without transformation may be written P+j.Q where (P,Q) is the two-dimensional symbol transmitted at a given instant and j expresses the rotation by $\pi/2$.

In the most general case, for a quadrature error equal to $\phi$, the signal as transformed may be written:

$$(P+Q)+e^{j(\pi/2-\phi)}\cdot(Q-P) \text{ or else } (P+Q)+j\cdot e^{-j\phi}\cdot(Q-P)$$

The following expression is then obtained:

$$e^{-j\phi/2}\cdot[(P+Q)\cdot e^{j\phi/2}+j\cdot(Q-P)e^{-j\phi/2}]$$

Grouping together the terms in P and in Q gives:

$$e^{-j\phi/2}\cdot[P\cdot(e^{j\phi/2}-j\cdot e^{-j\phi/2})+Q\cdot(e^{j\phi/2}+j\cdot e^{-j\phi/2})]$$

Since:

$$e^{j\phi/2}=\cos(\phi/2)+j\cdot\sin(\phi/2)$$

and $$e^{-j\phi/2}=\cos(\phi/2)-j\cdot\sin(\phi/2)$$

the following expression is obtained for the transmitted signal:

$$e^{-j\phi/2}\cdot\{P[\cos(\phi/2)+j\cdot\sin(\phi/2)-j.\cos(\phi/2)-\sin(\phi/2)]+Q[\cos(\phi/2)+j\cdot\sin(\phi/2)+j\cdot\cos(\phi/2)+\sin(\phi/2)]\}$$

which makes it possible to cause to appear, for P, a factor (1−j) representing a rotation of $-\pi/4$, and, for Q, a factor (1+j) which represents a rotation of $+\pi/4$:

$$e^{-j\phi/2}\cdot\{P\cdot(1-j)\cdot[\cos(\phi/2)-\sin(\phi/2)]+Q\cdot(1+j)\cdot[\cos(\phi/2)+\sin(\phi/2)]\}=\sqrt{2}\cdot P\cdot[e^{-j(\pi/4+\phi/2)}\cdot(\cos(\phi/2)-\sin(\phi/2))]+\sqrt{2}\cdot Q\cdot[e^{-j(-\pi/4+\phi/2)}\cdot(\cos(\phi/2)+\sin(\phi/2))]$$

This expression shows:

- a rotation of the constellation through an angle equal to $-(\phi/2+\pi/4)$; detection of P and Q, without intersymbol interference, is possible on two orthogonal axes offset relative to X respectively by $-(\phi/2+\pi/4)$ and by $-(\phi/2-\pi/4)$; and
- an amplitude difference between the signals detected on each axis, which difference is expressed by the terms $\cos(\phi/2)-\sin(\phi/2)$ on the axis X' and $\cos(\phi/2)+\sin(\phi/2)$ on the axis Y'.

It can be noted that if the quadrature error is zero ($\phi$=0), the amplitude variation disappears; in this case, $\cos(\phi/2)=1$, $\sin(\phi/2)=0$, and $\tan(\phi/2)=0$. The transformation effected then reduces to a single rotation by $\pi/4$ of the constellation.

It should be noted that the apparatus of the invention is applicable to synchronous or asynchronous demodulation. At reception, it is in particular independent of the signal-to-noise ratio of the link (and in particular independent of fading) and of rate recovery. It should be noted that no negative feedback loop is necessary, thereby making it possible to remedy the drawbacks mentioned in the description of the state of the art.

Simulations have shown that the apparatus of the invention makes it possible to correct a phase difference $\theta$ of about 10° between the axes X and Y without any problem, unlike state-of-the-art correction apparatus with which it is only possible to correct quadrature for an angle $\theta$ of about 70°.

The invention applies to any digital modulation whose constellation is ideally supported by two axes in quadrature, and in particular to any digital modulation having $2^n$ phase states, whether or not it is amplitude and phase modulation (M-APSK, where M is, for example, 4, 16 or more), and to any trellis coded modulation, whether or not the number of points of the constellation is equal to a power of 2. With respect to trellis coded modulation, the invention is particularly applicable to trellis coded modulation having 96 or 192 states. It also applies to any quadrature partial response system (QPRS), e.g. having 9, 25, 49, or 225 states.

By way of illustration, FIGS. 10, 11, and 12 respectively show an ideal constellation of a 16-APSK signal, a constellation of a 16-APSK signal affected by quadrature error, and the FIG. 11 constellation after the quadrature error has been corrected.

The following table gives the coordinates of the symbols referenced in these figures before and after quadrature correction by the operations P'=P+Q and Q'=Q–P.

| Symbol | (P; Q) | (P'; Q') |
|---|---|---|
| 1 | (+1; +1) | (+2; 0) |
| 2 | (+3; +1) | (+4; –2) |
| 3 | (+1; +3) | (+4; +2) |
| 4 | (+3; +3) | (+6; 0) |
| 5 | (+1; –1) | (0; –2) |
| 6 | (+3; –1) | (+2; –4) |
| 7 | (+1; –3) | (–2; –4) |
| 8 | (+3; –3) | (0; –6) |
| 9 | –(1; +1) | (0; +2) |
| 10 | –(3; +1) | (–2; +4) |
| 11 | –(1; +3) | (+2; +4) |
| 12 | –(3; +3) | (0; +6) |
| 13 | –(1; –1) | (–2; 0) |
| 14 | –(3; –1) | (–4; +2) |
| 15 | –(1; –3) | (–4; –2) |
| 16 | –(3; –3) | (–6; 0) |

I claim:

1. Apparatus for correcting quadrature error in a demodulation stage (2) supplying a digital signal constituted, at each symbol time, by a symbol of a constellation having a plurality of phase states or of amplitude and phase states, each symbol of said constellation being determined by two amplitude levels P and Q output by said demodulation stage (2);

said apparatus being characterized in that it comprises processing means (51) supplying two corrected amplitude levels P' and Q' on the basis of said amplitude levels P and Q, said corrected amplitude levels P' and Q' being respectively equal to the values in any one of the following pairs of values:

P+Q and Q–P
P+Q and P–Q
–P–Q and Q–P
–P–Q and P–Q
Q–P and P+Q
P–Q and P+Q
Q–P and –P–Q
P–Q and –P–Q.

2. Apparatus according to claim 1, characterized in that said corrected amplitude levels are applied to decision means.

3. Apparatus according to claim 1, characterized in that said processing means (51) are preceded by automatic gain control amplification means (49, 50) ensuring that the maximum levels of said amplitude levels P and Q are equal.

4. Apparatus according to claim 1, characterized in that said processing means (51) are followed by automatic gain control amplification means (70, 71) ensuring that the maximum levels of said corrected amplitude levels P' and Q' are equal.

5. Apparatus for correcting quadrature error in a modulation stage (1) to which a digital-type modulating signal is applied, the signal being constituted, at each symbol time, by a symbol of a constellation having a plurality of phase states or of amplitude and phase states, each symbol of said constellation being determined by two amplitude levels P and Q;

said apparatus being characterized in that it comprises processing means (51) supplying two corrected amplitude levels P' and Q' on the basis of said amplitude levels P and Q, said corrected amplitude levels P' and Q' being applied to said modulation stage (1) and being respectively equal to the values in any one of the following pairs of values:

P+Q and Q–P
P+Q and P–Q
–P–Q and Q–P
–P–Q and P–Q
Q–P and P+Q
P–Q and P+Q
Q–P and –P–Q
P–Q and –P–Q.

6. A receiver for receiving signals, each of which has a plurality of phase states or of amplitude and phase states, said receiver being characterized in that it includes apparatus for correcting quadrature error in a demodulation stage supplying a digital signal constituted, at each symbol time, by a symbol of a constellation having a plurality of phase states or of amplitude and phase states, each symbol of said constellation being determined by two amplitude levels P and Q output by said demodulation stage, said apparatus being characterized in that it comprises processing means supplying two corrected amplitude levels P' and Q' on the basis of said amplitude levels P and Q, said corrected amplitude levels P' and Q' being respectively equal to the values in any one of the following pairs of values:

P+Q and Q–P
P+Q and P–Q
–P–Q and Q–P
–P–Q and P–Q
Q–P and P+Q
P–Q and P+Q
Q–P and –P–Q
P–Q and –P–Q.

7. A transmitter for transmitting signals, each of which has a plurality of phase states or of amplitude and phase states, said transmitter being characterized in that it includes apparatus for correcting quadrature error in a demodulation stage supplying a digital signal constituted, at each symbol time, by a symbol of a constellation having a plurality of phase states or of amplitude and phase states, each symbol of said constellation being determined by two amplitude levels P and Q output by said demodulation stage, said apparatus being characterized in that it comprises processing means supplying two corrected amplitude levels P' and Q' on the basis of said amplitude levels P and Q, said corrected amplitude levels P' and Q' being respectively equal to the values in any one of the following pairs of values:

P+Q and Q–P
P–Q and P–Q
–P–Q and Q–P
–P–Q and P–Q
Q–P and P+Q
P–Q and P+Q
Q–P and –P–Q
P–Q and –P–Q.

* * * * *